Feb. 17, 1970  K. A. HOAGLAND  3,495,913
FOCAL PLANE DETERMINING SYSTEM
Filed June 7, 1965

United States Patent Office 3,495,913
Patented Feb. 17, 1970

3,495,913
FOCAL PLANE DETERMINING SYSTEM
Kenneth A. Hoagland, Butler, N.J., assignor to Fairchild Camera and Instrument Corporation, a corporation of Delaware
Filed June 7, 1965, Ser. No. 461,723
Int. Cl. G03b 3/10
U.S. Cl. 356—124                 9 Claims

ABSTRACT OF THE DISCLOSURE

A system for determining a focal plane of an optical lens system comprises a photoconductive sensor having an illumination-resistance characteristic of a gamma of the order of 0.5. The sensor is moved sinusoidally with respect to time along the principal optical axis of the lens system over a range including the focal plane of the lens system. When the range of oscillation of the sensor includes the focal plane of the optical system, a signal component of a frequency equal to the fundamental frequency of movement of the sensor is developed and another signal component of twice such frequency is also developed. The signal components of different frequencies are selected by filter means, the output of the filters are rectified and coupled in opposite senses to a modulator, the output of which is a desired signal representative of the ratio of the amplitude of the harmonic frequency component to that of the fundamental frequency component.

---

Figure 1:
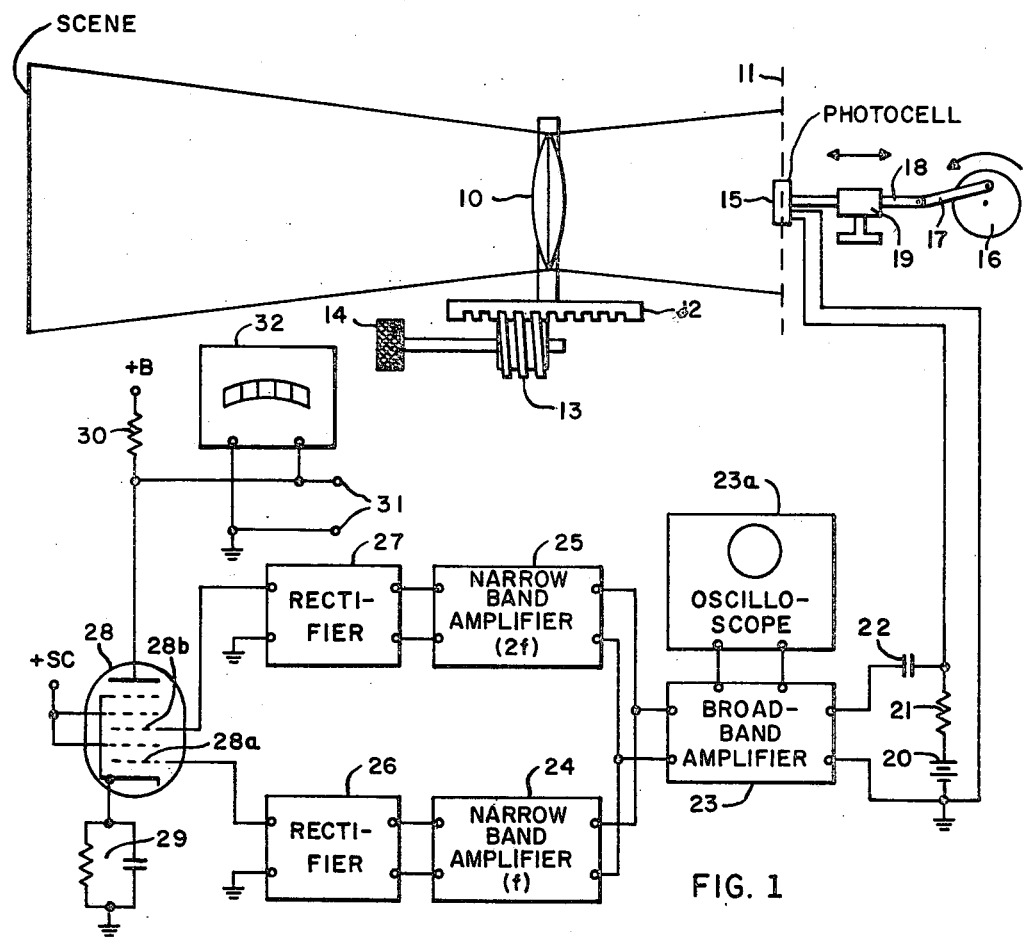

This invention relates to focal plane determining systems and particularly to such systems suitable for accurately determining the focus of a camera optical system to permit optimum adjustment thereof when viewing a natural scene.

Heretofore, there have been proposed various apparatus and systems for determining the position of the focal plane of an optical system, such as that of a camera. Such prior apparatus have, in general, used photosensitive devices having linear illumination-response characteristics and have consequently required some form of scanning aperture or other auxiliary optical elements to generate an output related to the focus condition of elemental image areas. These auxiliary optical devices have had the effect of degrading the resolution of the system and lowering its sensitivity. Consequently, such prior apparatus and systems have, in general, required the use of high contrast test patterns and have not been suitable for determining the focus of an optical system when viewing a natural scene.

It is an object of the invention therefore, to provide a new and improved focal plane determining system which obviates the above-mentioned limitations of prior systems of this type.

It is another object of the invention to provide a new and improved focal plane determining system which is capable of giving accurate focusing information while viewing a natural scene.

It is a further object of the invention to provide a new and improved focal plane determining system characterized by maximum sensitivity and a maximum signal-to-noise ratio.

In accordance with the invention, there is provided a system for determining a focal plane of an optical lens system comprising a photoelectric sensor having a nonlinear illumination-response characteristic, means for cyclically moving the sensor in a direction having a substantial component parallel to the axis of symmetry of the lens system, the range of movement including the focal plane of the optical system, the sensor being effective to develop a first signal component of a frequency equal to the fundamental frequency of movement thereof and a second signal component of a harmonic of such frequency, and circuit means coupled to the sensor for deriving an output signal representative of the ratio of the amplitudes of the first and second signal components, such derived signal being indicative of the average displacement of the sensor from the focal plane of the optical system.

For a better understanding of the present invention, together with other and further objects thereof, reference is had to the following description, taken in connection with the accompanying drawing, while its scope will be pointed out in the appended claims.

Figure 2:
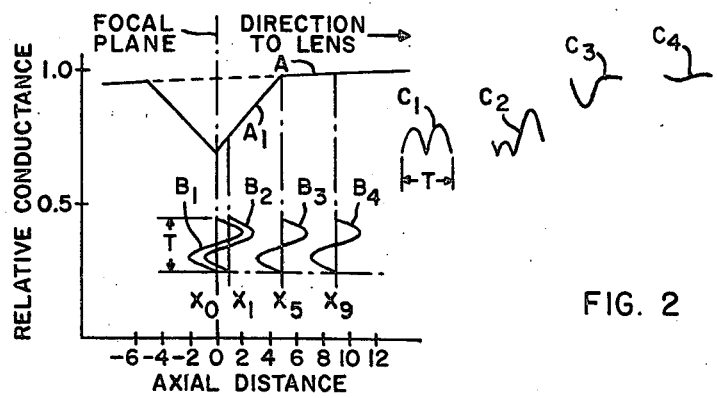

Referring now to the drawing:

FIG. 1 is a representation, partly schematic, of a focal plane determining system embodying the present invention, while FIG. 2 is a graph illustrating certain operating characteristics of the system of FIG. 1.

Referring now more particularly to the drawing, there is represented a system for determining the focal plane of an optical lens system such as a camera lens system, represented schematically by an objective lens 10, for viewing a scene and bringing it to a focus at an image plane or focal plane represented by the dash line 11. The objective lens 10 is mounted for movement along the optical axis of the system by a mechanism represented schematically by a threaded rack 12, a worm wheel 13, and a manual adjusting knob 14. The term "optical lens systems" is intended to embrace systems operable not only on visible light but also on ultraviolet and infrared radiations.

The system of the invention includes a photoelectric sensor having a nonlinear illumination-response characteristic, for example a photoconductive sensor 15 having a sensitive surface such as cadmium sulphide or cadmium selenide having an illumination-response characteristic of a gamma of the order of 0.5. It is important that the gamma characteristic be either substantially greater than, or substantially less than, 1. One such sensor is commercially available as the Type 907 photoconductive cell manufactured by the Clairex Corporation.

The system of the invention also comprises means for cyclically moving the sensor 15 in a direction having a substantial component parallel to the axis of symmetry of the optical system represented by the lens 10, specifically, as shown, along such axis, the range of movement including the focal plane 11. The mechanism for cyclically moving the sensor 15 may be of any suitable type but there is shown schematically, by way of example, a rotatable crank disc 16 connected by a link 17 to reciprocate a link 18, on which the sensor 15 is mounted, in a slide bearing 19. Such a mechanism will impart to the sensor 15 a motion which is substantially sinusoidal with respect to time along the principal optical axis of the system. The frequency of oscillation of sensor 15 is preferably chosen as the maximum permitted by its response and recovery times.

The system of the invention further comprises circuit means coupled to the sensor 15 for deriving an output signal representative of the relative amplitudes of the signal components of the output of the sensor 15 at the fundamental frequency of movement thereof and at a harmonic of such frequency, particularly the second harmonic when the motion of the sensor 15 is sinusoidal. Such a derived signal will be indicative of the average displacement of the sensor 15 from the focal plane 11. The circuit means just described includes a suitable source, such as a battery 20 connected across the sensor 15 through a load resistor 21, whereby the resistance of the sensor 15, which varies with illumination, is in series with the resistor 21 across the battery 20. The signal output of the sensor 15 developed across the load resistor 21 is A.C. coupled through a capacitor 22 to a broad-band amplifier 23 which may be of conventional construction and operation. If desired, a cathode-ray oscilloscope 23a may be coupled to the unit 23 to monitor the wave form of the signal output of sensor 15.

Connected to the output of the amplifier 23 is a first filter means, specifically a narrow-band amplifier 24, coupled to the sensor 15 through the circuit described and having a restricted pass band including the fundamental frequency $f$ of movement of the sensor 15. There is also provided a seocnd filter means coupled to the sensor 15 through the circuit described, specifically a narrow-band amplifier 25, having a restricted pass band including the second harmonic $2f$ of the fundamental frequency.

The system of the invention further comprises means coupled to the filter means 24, 25 for deriving an output signal representative of the relative outputs of the first and second filter means. The latter means comprises a pair of rectifiers 26 and 27 individually coupled to the units 24, 25, respectively, and a modulator 28. The modulator 28 may be a pentagrid tube of conventional type having input electrodes 28a and 28b individually coupled to the rectifiers 26 and 27, respectively. The modulator tube 28 is provided with a suitable cathode-biasing circuit 29 and a load resistor 30 connected to a suitable source +B. The output signal developed across the load resistor 30 then appears at output terminals 31. The signal at the terminals 31 may be applied to a meter 32 or otherwise utilized to aid in adjusting the lens 10 to bring the optical system into focus at the plane 11.

It is believed that the operation of the focal plane determining system of the invention will be clear from the foregoing description. If it be assumed that the optical system represented by the lens 10 is correctly adjusted so that the image plane coincides precisely with the line 11 and that the sensitive surface of the sensor 15 in its mean position lies precisely in that plane, the image will be correctly focused and there will, of course, be a maximum contrast between the light and dark areas of the scene and the resistance of the sensor 15 will have some given value. When the sensor 15 moves away from this central position in either direction, the image on its surface will be out of focus and the contrast between the light and dark areas of the scene will be decreased. Assuming that the average illumination of the sensor 15 remains the same (as is approximately achieved for the small displacements required to completely defocus fine structure images) and assuming a gamma characteristic of the order of 0.5, the resistance of the sensor 15 will drop from its maximum value at a central position due to its nonlinear characteristic. Since the resistance of the sensor 15 is in series with the load resistor 21, an increase in the resistance of the sensor decreases the load current and decreases the signal output across resistor 21 and vice versa. If the sensor 15 is oscillated cyclically about a mean position lying in the plane 11 of a frequency $f$, the signal across the resistor 21 will go through a minimum each time the sensor 15 passes its mean position so that the output signal across resistor 21 will contain strong components at frequency $2f$, corresponding to a second harmonic signal.

If it be assumed that the optical system including the lens 10 is defocused so that the sensor 15 in its cyclical movement does not pass through the focal plane 11 or the nearby region containing partially focused information, the output signal across the load resistor 21 will be substantially sinusoidal at the fundamental frequency $f$ and of relatively low amplitude. If the position of the focal plane relative to the mean position of the sensor 15 is such that its motion is unsymmetrical relative to that plane, that is, greater on one side than the other, the output signal across resistor 21 will comprise components of the same fundamental frequency $f$ and harmonic thereof, particularly the second harmonic $2f$. When the focal plane and mean position of the sensor 15 coincide, a maximum amplitude second harmonic signal can be observed. Therefore, the optical system can be focused by adjusting the lens 10 until the output signal is a second harmonic of maximum amplitude but such method is subject to certain errors pointed out below.

If the sensor 15 is in a cyclical motion symmetrical with respect to the focal plane at a frequency $f$ and the optical system is not viewing any scene in detail so that no image information is present, a small-amplitude signal at frequency $f$ can still be observed. This signal is the result of the ability of the sensor 15 to respond to the difference in illumination density for positions nearer to and farther from the exit aperture of the lens 10. This spurious signal may be kept to very low amplitudes, with resultant improved detection sensitivity for weak focused image information, by limiting the extent of movement of the sensor 15 to a small fraction of the focal length of the lens 10. This motion may be of the order of 0.01 inch.

The effect of such average brightness modulation of the signal across the resistor 21 is eliminated by the present invention by selecting and separating the fundamental frequency component in the unit 24 and the second harmonic components in the unit 25, individually rectifying their outputs in rectifiers 26 and 27, respectively, and applying the rectified outputs with opposite polarities to the input electrodes 28a and 28b of modulator 28. With this arrangement, the output signal at the load resistor 30 is representative of the ratio of the amplitude of the fundamental frequency component to the second harmonic frequency component and the average brightness modulations of the fundamental and second harmonic signal components are equal and cancel out in the modulator 28.

The operating characteristics of the system of FIG. 1 are illustrated in the graph of FIG. 2 in which the incremental coordinates have been exaggerated for the sake of clarity. In FIG. 2, Curve A is an idealized representation of variations of the conductance of the sensor 15 with movement along the optical axis of symmetry in the vicinity of high-contrast focused-image information. In the absence of focus information, a gradual increase in conductance occurs as the sensor 15 is moved toward the lens 10, as indicated by the slight average inclination of Curve A. The notch region $A_1$ of Curve A is the result of the varying degrees of focus sharpness for the image information, with maximum sharpness occurring in position zero, that is, at the focal plane.

The cyclical motions of the sensor 15 are shown as Curves $B_1$, $B_2$, $B_3$, and $B_4$, a series of sinusoidal variations with time having a period T and corresponding to motions about axis positions indicated as $X_0$, $X_1$, $X_5$, and $X_9$. Corresponding variations in the conductance of the sensor 15, derived in a well-known manner by application of Curves $B_1$–$B_4$ to characteristic Curve A, are represented by Curves $C_1$–$C_4$, each representing one period T of the curves of $B_1$ to $B_4$.

For most positions of the sensor 15, the wave forms are complex and contain strong even or odd harmonics or both. For example, Curve $C_3$ is similar to the wave form of a half-wave rectified sine wave which contains strong even harmonics. Curve $C_1$ contains both odd and even harmonics, corresponding to its fundamental period $T/2$. For every mean position of sensor 15, a fundamental component similar to that represented by Curve $C_4$ appears, superimposed upon whatever signal may be derived from exploration of the focused region information.

Curves $C_1$–$C_4$ show that the use of the ratio detection method of the present invention optimizes performance. Not only does it exclude the effects of the fundamental frequency component of period T but, in addition, it differentiates between positions nearby but not precisely at the best focus condition. A simple detector of the second harmonic signal tends to yield confusing signals, contributing to a lack of precision, particularly if the signal wave shapes for mean positions near and at the focal plane vary as the result of differences in luminance, target geometry, and contrast.

While there has been described what is, at present, considered to be the preferred embodiment of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. A system for determining a focal plane of an optical lens system comprising:
   a photoelectric sensor having a nonlinear illumination-response characteristic;
   means for cyclically moving said sensor in a direction having a substantial component parallel to the axis of symmetry of the lens system, the range of movement including said focal plane, said sensor being effective to develop a first signal component of a frequency equal to the fundamental frequency of movement thereof and a second signal component of a harmonic of said frequency;
   and circuit means coupled to said sensor for deriving an output signal representative of the ratio of the amplitudes of said first and second signal components, said derived signal being indicative of the average displacement of said sensor from said focal plane.

2. A focal plane determining system in accordance with claim 1 in which the direction of movement of said sensor has a major component parallel to the axis of symmetry of the lens system.

3. A focal plane determining system in accordance with claim 1 in which said sensor is moved along an axis of symmetry of the lens system.

4. A focal plane determining system in accordance with claim 1 in which said sensor is a photoconductive device having a nonlinear illumination-resistance characteristic.

5. A focal plane determining system in accordance with claim 1 in which said sensor has an illumination-response characteristic of a gamma of the order of 0.5.

6. A focal plane determining system in accordance with claim 1 in which said sensor is moved along the principal optical axis of the lens system.

7. A focal plane determining system in accordance with claim 1 in which the means for deriving said output signal comprises:
   first filter means coupled to said sensor having a restricted pass band including the fundamental frequency of movement of said sensor;
   second filter means coupled to said sensor having a restricted pass band including a harmonic of said fundamental frequency;
   and means coupled to both said filter means for deriving the output signal.

8. A focal plane determining system in accordance with claim 7 in which said sensor is moved substantially sinusoidally with respect to time.

9. A focal plane determining system in accordance with claim 7 which includes a pair of rectifiers individually coupled to said filter means and a modulator having input electrodes individually coupled to said rectifiers for deriving the output signal.

References Cited

UNITED STATES PATENTS

| | | |
|---|---|---|
| 2,134,757 | 11/1938 | Goldsmith. |
| 3,041,459 | 6/1962 | Greene. |
| 3,385,159 | 5/1968 | Bliss et al. |

FOREIGN PATENTS

| | | |
|---|---|---|
| 1,319,100 | 1/1963 | France. |

OTHER REFERENCES

"Electrical Engineering," Automatic Electronic Focusing System Developed; February 1959, vol. 78 #2, p. 195.

RONALD L. WIBERT, Primary Examiner

V. P. McGRAW, Assistant Examiner

U.S. Cl. X.R.

95—44; 353—101; 356—4